US010350696B2

(12) United States Patent
Gelmetti et al.

(10) Patent No.: US 10,350,696 B2
(45) Date of Patent: Jul. 16, 2019

(54) WIRE FEED SYSTEM AND METHOD OF CONTROLLING FEED OF WELDING WIRE

(71) Applicant: AWDS TECHNOLOGIES SRL, Rovereto (TN) (IT)

(72) Inventors: Carlo Gelmetti, Lazise (IT); Filippo Corradini, Isera (IT); Fabio Perazzoli, Lazise (IT)

(73) Assignee: AWDS TECHNOLOGIES SRL (IT)

( * ) Notice: Subject to any disclaimer, the term of this patent is extended or adjusted under 35 U.S.C. 154(b) by 53 days.

(21) Appl. No.: 14/679,768

(22) Filed: Apr. 6, 2015

(65) Prior Publication Data
US 2016/0288237 A1 Oct. 6, 2016

(51) Int. Cl.
*B23K 9/12* (2006.01)
*B23K 9/133* (2006.01)
(Continued)

(52) U.S. Cl.
CPC .............. *B23K 9/124* (2013.01); *B23K 9/122* (2013.01); *B23K 9/125* (2013.01); *B23K 9/133* (2013.01);
(Continued)

(58) Field of Classification Search
CPC ........ B23K 9/122; B23K 9/124; B23K 9/125; B23K 9/133; B23K 9/1336; B23K 9/1087; B23K 9/0953; B23K 9/0956; B23K 9/173; B23K 9/092; B23K 9/095; B23K 9/1062; B23K 9/10; B23K 9/1333; B23K 9/1006; B23K 9/0735; B23K 9/09; B23K 9/091; B23K 9/32; B23K 37/00; B23K 9/073; B23K 9/093; B23K 9/1012; B23K 9/167;
(Continued)

(56) References Cited

U.S. PATENT DOCUMENTS 318,062 A 5/1885 Warren
532,565 A 1/1895 Kilmer
(Continued)

FOREIGN PATENT DOCUMENTS

| CN | 1466469 | 1/2004 | ............ A61L 15/60 |
| CN | 1626423 | 6/2005 | ............ B65H 75/16 |

(Continued)

OTHER PUBLICATIONS

Office Action issued in U.S. Appl. No. 14/195,497, dated May 19, 2016 (35 pgs).
(Continued)

*Primary Examiner* — Ibrahime A Abraham
*Assistant Examiner* — Chris Q Liu
(74) *Attorney, Agent, or Firm* — Hayes Soloway P.C.

(57) ABSTRACT

A wire feeding system, in particular for feeding a so called "cold wire" or wire with no tension nor signal running on its surface, in which the pulling or holding of the wire by the front wire feeder puts the rear pushing slave booster respectively into a pre-set active full motor torque or into a pre-set stand-by minimum motor torque, as needed. Alternatively, a wire feed system for feeding a so called "cold wire" or wire with no tension nor signal running on its surface, in which the rear pushing slave booster is remotely controlled by an optic sensor positioned nearby the torch and sensing the light of the torch welding or spraying arc.

16 Claims, 6 Drawing Sheets

(51) Int. Cl.
*B65H 51/30* (2006.01)
*B65H 51/10* (2006.01)
*B65H 57/12* (2006.01)

(52) U.S. Cl.
CPC ........... *B23K 9/1336* (2013.01); *B65H 51/10* (2013.01); *B65H 51/30* (2013.01); *B65H 57/12* (2013.01); *B65H 2701/36* (2013.01)

(58) Field of Classification Search
CPC .. B23K 9/295; B23K 2101/10; B23K 26/211; B23K 31/02; B23K 31/12; B23K 9/06; B23K 9/12; B23K 9/182; B23K 9/28; B23K 9/30; B23K 9/322; B23K 9/323
USPC ............ 219/137.7, 137.71, 137 R, 132, 136, 219/137 PS, 130.21, 130.51, 130.01, 219/130.5, 137.9, 124.01, 124.03, 137.2, 219/138, 121.11, 125.1, 125.11, 125.12, 219/127, 137.31, 137.44, 137.51, 137.61
See application file for complete search history.

(56) References Cited

U.S. PATENT DOCUMENTS

| | | |
|---|---|---|
| 617,353 A | 1/1899 | Redmond |
| 627,722 A | 6/1899 | Edwards |
| 932,808 A | 8/1909 | Pelton |
| 1,276,117 A | 8/1918 | Riebe .......................... 464/171 |
| 1,468,994 A | 9/1923 | Cook ........................... 206/393 |
| 1,508,689 A | 9/1924 | Glasser ................... 219/124.03 |
| 1,640,368 A | 8/1927 | Obetz |
| 1,821,354 A | 9/1931 | Meyer .......................... 242/159 |
| 1,907,051 A | 5/1933 | Emery |
| 1,936,227 A | 11/1933 | Cook ............................. 206/59 |
| 2,027,670 A | 1/1936 | Broeren ......................... 312/62 |
| 2,027,674 A | 1/1936 | Broeren ......................... 312/60 |
| 2,059,462 A | 11/1936 | Jungmann |
| 2,078,161 A | 4/1937 | Rietseh .......................... 74/297 |
| 2,329,369 A | 9/1943 | Haver ............................. 285/11 |
| 2,366,101 A | 12/1944 | Grothey ..................... 66/125 R |
| 2,407,746 A | 9/1946 | Johnson |
| 2,457,910 A | 1/1949 | McLaren et al. ............... 74/501 |
| 2,477,059 A | 7/1949 | Hill ............................ 242/137.1 |
| 2,483,760 A | 10/1949 | Duncan .......................... 254/190 |
| 2,579,131 A | 12/1951 | Tinsley ......................... 206/409 |
| 2,580,900 A | 1/1952 | Epstein ......................... 206/409 |
| 2,679,571 A | 5/1954 | Chappel ................... 219/137.44 |
| 2,694,130 A | 11/1954 | Howard ........................... 219/8 |
| 2,713,938 A | 7/1955 | Snyder |
| 2,724,538 A | 11/1955 | Schweich |
| 2,752,108 A | 6/1956 | Richardson ................... 242/128 |
| 2,838,922 A | 6/1958 | Gift .............................. 66/125 R |
| 2,849,195 A | 8/1958 | Richardson |
| 2,864,565 A | 12/1958 | Whearly ........................ 242/128 |
| 2,869,719 A | 1/1959 | Hubbard |
| 2,880,305 A | 3/1959 | Baird |
| 2,911,166 A | 11/1959 | Haugwitz ...................... 242/128 |
| 2,929,576 A | 3/1960 | Henning |
| 2,966,258 A | 12/1960 | Krafft |
| 2,974,850 A | 3/1961 | Mayer |
| 2,984,596 A | 5/1961 | Franer ........................... 206/412 |
| 3,022,415 A | 2/1962 | Francois .................... 219/137.44 |
| 3,096,951 A | 7/1963 | Jenson ........................ 242/137.1 |
| 3,108,180 A | 10/1963 | Linnander ................. 219/137.44 |
| 3,119,042 A | 1/1964 | Bond |
| 3,185,185 A | 5/1965 | Pfund |
| 3,244,347 A | 4/1966 | Jenk |
| 3,274,850 A | 9/1966 | Tascio ............................ 74/501 |
| 3,283,121 A | 11/1966 | Bernard et al. ........... 219/137.44 |
| 3,284,608 A | 11/1966 | McDonald ............... 219/137.43 |
| 3,344,682 A | 10/1967 | Bratz ............................. 74/501 |
| 3,352,412 A | 11/1967 | Draving et al. ................ 206/59 |
| 3,433,504 A | 3/1969 | Hanes ............................ 285/93 |
| 3,463,416 A | 8/1969 | Quenot ....................... 242/396.9 |
| 3,478,435 A | 11/1969 | Cook |
| 3,491,876 A | 1/1970 | Zecchin |
| 3,512,635 A | 5/1970 | Lang |
| 3,536,888 A | 10/1970 | Borneman ............... 219/137.43 |
| 3,565,129 A | 2/1971 | Field |
| 3,567,900 A | 3/1971 | Nelson |
| 3,576,966 A | 5/1971 | Sullivan |
| 3,586,222 A * | 6/1971 | Rosen .................... B23K 9/125 219/137.71 |
| 3,595,277 A | 7/1971 | Lefever |
| 3,630,425 A | 12/1971 | Wilkens ........................ 226/108 |
| 3,648,920 A | 3/1972 | Stump |
| 3,672,655 A | 6/1972 | Carter ........................... 226/108 |
| 3,675,499 A | 7/1972 | Marosy ....................... 24/573.11 |
| 3,690,567 A | 9/1972 | Borneman .................... 239/591 |
| 3,724,249 A | 4/1973 | Asbeck et al. |
| 3,729,092 A | 4/1973 | Marcell |
| 3,730,136 A | 5/1973 | Okada ............................ 118/78 |
| 3,799,215 A | 3/1974 | Willems |
| 3,815,842 A | 6/1974 | Scrogin ........................ 242/423.1 |
| 3,823,894 A | 7/1974 | Frederick et al. ........... 242/137.1 |
| 3,939,978 A | 2/1976 | Thomaswick ................. 206/454 |
| 4,000,797 A | 1/1977 | Ducanis .......................... 193/38 |
| 4,043,331 A | 8/1977 | Martin et al. .................. 128/156 |
| 4,044,583 A | 8/1977 | Kinney, Jr. |
| 4,074,105 A | 2/1978 | Minehisa et al. |
| 4,097,004 A | 6/1978 | Reese ........................... 242/129 |
| 4,102,483 A | 7/1978 | Ueyama et al. |
| 4,113,795 A | 9/1978 | Izawa et al. .................... 524/84 |
| 4,127,590 A | 11/1978 | Endo et al. ................. 260/346.74 |
| 4,157,436 A | 6/1979 | Endo et al. ..................... 528/167 |
| 4,161,248 A | 7/1979 | Kalmanovitch ............... 206/389 |
| 4,171,783 A | 10/1979 | Waltemath .................... 242/128 |
| 4,172,375 A | 10/1979 | Rushforth et al. |
| 4,188,526 A | 2/1980 | Asano |
| 4,222,535 A | 9/1980 | Hosbein ........................ 242/128 |
| 4,254,322 A | 3/1981 | Asano |
| 4,274,607 A | 6/1981 | Priest ............................. 242/163 |
| 4,280,951 A | 7/1981 | Saito et al. ..................... 524/118 |
| 4,293,103 A | 10/1981 | Tsukamoto |
| 4,354,487 A | 10/1982 | Oczkowski et al. .......... 604/366 |
| 4,392,606 A | 7/1983 | Fremion ....................... 206/600 |
| 4,396,797 A | 8/1983 | Sakuragi et al. ................ 174/68 |
| 4,429,001 A | 1/1984 | Kolpin et al. ................. 442/340 |
| 4,451,014 A | 5/1984 | Kitt et al. ...................... 242/128 |
| 4,464,919 A | 8/1984 | Labbe |
| 4,500,315 A | 2/1985 | Pieniak et al. ................ 604/379 |
| 4,531,040 A | 7/1985 | Nawa ............................ 219/136 |
| 4,540,225 A | 9/1985 | Johnson et al. ............... 439/192 |
| 4,546,631 A | 10/1985 | Eisinger |
| 4,575,612 A | 3/1986 | Prunier ...................... 219/137.43 |
| 4,581,514 A | 4/1986 | Inoue ............................ 204/225 |
| 4,582,198 A | 4/1986 | Ditton |
| 4,585,487 A | 4/1986 | Destree et al. |
| 4,623,063 A | 11/1986 | Balkin |
| 4,737,567 A | 4/1988 | Matsumoto et al. .......... 528/167 |
| 4,742,088 A | 5/1988 | Kim .............................. 521/118 |
| 4,826,497 A | 5/1989 | Marcus et al. ................ 604/359 |
| 4,855,179 A | 8/1989 | Bourland et al. ............. 442/409 |
| 4,868,366 A | 9/1989 | Joseph et al. .............. 219/137.71 |
| 4,869,367 A | 9/1989 | Kawasaki et al. ............. 206/409 |
| 4,891,493 A | 1/1990 | Sato et al. ...................... 219/137 |
| 4,916,282 A | 4/1990 | Chamming et al. .......... 219/69.2 |
| 4,918,286 A | 4/1990 | Boyer ...................... 219/137.44 |
| 4,949,567 A | 8/1990 | Corbin ........................... 72/164 |
| 4,974,789 A | 12/1990 | Milburn ........................ 242/159 |
| 5,051,539 A | 9/1991 | Leathers-Wiessner ....... 174/15.7 |
| 5,061,259 A | 10/1991 | Goldman et al. ............. 604/368 |
| 5,078,269 A | 1/1992 | Dekko et al. .................. 206/397 |
| 5,100,397 A | 3/1992 | Poccia et al. ................. 604/365 |
| 5,105,943 A | 4/1992 | Lesko et al. ................... 206/397 |
| 5,109,983 A | 5/1992 | Malone et al. ................ 206/408 |
| 5,147,646 A | 9/1992 | Graham ........................ 424/424 |
| 5,165,217 A | 11/1992 | Sobel et al. ................... 242/159 |
| 5,201,419 A | 4/1993 | Hayes ........................... 206/409 |
| 5,205,412 A | 4/1993 | Krieg ............................ 206/394 |
| 5,215,338 A | 6/1993 | Kimura et al. ................ 285/166 |
| 5,227,314 A | 7/1993 | Brown et al. ................... 437/10 |
| 5,261,625 A | 11/1993 | Lanoue ....................... 242/129.8 |
| 5,277,314 A | 1/1994 | Cooper et al. ................ 206/398 |

(56) References Cited

U.S. PATENT DOCUMENTS

| | | | | |
|---|---|---|---|---|
| 5,314,111 A | 5/1994 | Takaku et al. | | 229/110 |
| 5,368,245 A | 11/1994 | Fore | | 242/171 |
| 5,372,269 A | 12/1994 | Sutton et al. | | 220/62 |
| 5,452,841 A | 9/1995 | Sibata et al. | | 228/180.5 |
| 5,485,968 A | 1/1996 | Fujioka | | 242/172 |
| 5,494,160 A | 2/1996 | Gelmetti | | 206/395 |
| 5,530,088 A | 6/1996 | Sheen et al. | | 528/287 |
| 5,553,810 A | 9/1996 | Bobeczko | | 242/601 |
| 5,562,646 A | 10/1996 | Goldman et al. | | 604/368 |
| 5,585,013 A | 12/1996 | Truty | | 219/69.12 |
| 5,586,733 A | 12/1996 | Miura et al. | | 242/125.2 |
| 5,590,848 A | 1/1997 | Shore et al. | | 242/361 |
| 5,629,377 A | 5/1997 | Burgert et al. | | 524/832 |
| 5,665,801 A | 9/1997 | Chang et al. | | 524/125 |
| 5,692,700 A | 12/1997 | Bobeczko | | 242/588.2 |
| 5,714,156 A | 2/1998 | Schmidt et al. | | 424/404 |
| 5,738,209 A | 4/1998 | Burr et al. | | 206/397 |
| 5,739,704 A | 4/1998 | Clark | | 326/62 |
| 5,746,380 A | 5/1998 | Chung | | 242/171 |
| 5,758,834 A | 6/1998 | Dragoo et al. | | 242/128 |
| 5,778,939 A | 7/1998 | Hok-Yin | | 138/120 |
| 5,816,466 A | 10/1998 | Seufer | | 226/187 |
| 5,819,934 A | 10/1998 | Cooper | | 206/397 |
| 5,845,862 A | 12/1998 | Cipriani | | 242/423.1 |
| 5,847,184 A | 12/1998 | Kleiner | | 558/73 |
| 5,865,051 A | 2/1999 | Otzen et al. | | 72/17.3 |
| 5,921,391 A | 7/1999 | Ortiz et al. | | 206/397 |
| 5,931,408 A | 8/1999 | Ishii et al. | | 242/580 |
| 5,932,123 A * | 8/1999 | Marhofer | | B23K 9/12 219/125.11 |
| 5,971,308 A | 10/1999 | Boulton | | 242/131 |
| 5,988,370 A | 11/1999 | Roemer et al. | | 206/215 |
| 5,990,377 A | 11/1999 | Chen et al. | | 604/381 |
| 6,016,911 A | 1/2000 | Chen | | 200/395 |
| 6,019,303 A | 2/2000 | Cooper | | 424/361.4 |
| 6,103,358 A | 8/2000 | Bruggermann et al. | | 428/317.9 |
| 6,150,632 A | 11/2000 | Fisher | | 219/137.71 |
| 6,159,591 A | 12/2000 | Beihoffer et al. | | 428/327 |
| 6,236,017 B1 | 5/2001 | Smartt | | 219/130.01 |
| 6,237,768 B1 | 5/2001 | Cipriani | | 206/408 |
| 6,245,880 B1 | 6/2001 | Takeuchi et al. | | 528/287 |
| 6,255,371 B1 | 7/2001 | Schlosser et al. | | 524/100 |
| 6,260,781 B1 | 7/2001 | Cooper | | 424/361.4 |
| 6,301,944 B1 | 10/2001 | Offer | | 72/79 |
| 6,322,016 B1 | 11/2001 | Jacobsson et al. | | 424/356.4 |
| 6,340,522 B1 | 1/2002 | Burke et al. | | 428/359 |
| 6,408,888 B1 | 6/2002 | Baeumer et al. | | 138/120 |
| 6,409,116 B1 | 6/2002 | Brown | | 242/419.1 |
| 6,417,425 B1 | 7/2002 | Whitmore et al. | | 604/367 |
| 6,425,549 B1 | 7/2002 | Bae et al. | | 242/580 |
| 6,464,077 B1 | 10/2002 | Liu | | 206/388 |
| 6,479,793 B1 | 11/2002 | Wittmann | | 219/130.5 |
| 6,481,892 B1 | 11/2002 | Agostini | | 384/43 |
| 6,498,227 B1 | 12/2002 | Horie | | 528/176 |
| 6,524,010 B1 | 2/2003 | Derman | | 384/513 |
| 6,547,176 B1 | 4/2003 | Blain et al. | | 242/423.1 |
| 6,564,943 B2 | 5/2003 | Barton et al. | | 206/395 |
| 6,613,848 B1 | 9/2003 | Wang et al. | | 525/481 |
| 6,636,776 B1 | 10/2003 | Barton et al. | | 700/169 |
| 6,648,141 B2 | 11/2003 | Land | | 206/408 |
| 6,649,870 B1 | 11/2003 | Barton et al. | | 219/137 |
| 6,708,864 B2 | 3/2004 | Ferguson, III et al. | | 228/56.3 |
| 6,715,608 B1 | 4/2004 | Moore | | 206/397 |
| 6,745,899 B1 | 6/2004 | Barton | | 206/409 |
| 6,749,139 B2 | 6/2004 | Speck | | |
| 6,750,262 B1 | 6/2004 | Hahnle et al. | | 521/64 |
| 6,753,454 B1 | 6/2004 | Smith et al. | | 602/41 |
| 6,821,454 B2 | 11/2004 | Visca et al. | | 34/341 |
| 6,831,142 B2 | 12/2004 | Mertens et al. | | 526/328.5 |
| 6,831,251 B1 * | 12/2004 | Artelsmair | | B23K 9/1336 219/137.71 |
| 6,872,275 B2 | 3/2005 | Ko et al. | | 156/181 |
| 6,889,835 B2 | 5/2005 | Land | | 206/408 |
| 6,913,145 B2 | 7/2005 | Barton | | 206/409 |
| 6,938,767 B2 | 9/2005 | Gelmetti | | 206/408 |
| 6,977,357 B2 | 12/2005 | Hsu et al. | | 219/130.01 |
| 7,004,318 B2 | 2/2006 | Barton | | 206/409 |
| 7,108,916 B2 | 9/2006 | Ehrnsperger et al. | | 428/403 |
| 7,147,176 B2 | 12/2006 | Rexhaj | | 242/417.3 |
| 7,152,735 B2 | 12/2006 | Dragoo et al. | | 206/408 |
| 7,156,334 B1 | 1/2007 | Fore et al. | | 242/171 |
| 7,178,755 B2 | 2/2007 | Hsu et al. | | 242/423.1 |
| 7,198,152 B2 | 4/2007 | Barton et al. | | 206/409 |
| 7,220,942 B2 | 5/2007 | Barton et al. | | 219/137.7 |
| 7,301,124 B2 | 11/2007 | Kaufman | | 219/137.71 |
| 7,309,038 B2 | 12/2007 | Carroscia | | 206/409 |
| 7,377,388 B2 | 5/2008 | Hsu et al. | | 206/389 |
| RE40,351 E | 6/2008 | Cipriani | | 242/423.1 |
| 7,398,881 B2 | 7/2008 | Barton et al. | | 206/408 |
| 7,410,111 B2 | 8/2008 | Carroscia | | 242/566 |
| 7,441,657 B2 | 10/2008 | Gelmetti | | 206/393 |
| 7,441,721 B2 | 10/2008 | Bae et al. | | 242/128 |
| 7,533,906 B2 | 5/2009 | Luettgen et al. | | 285/146.1 |
| 7,563,840 B2 | 7/2009 | Ye | | 524/449 |
| 7,748,530 B2 | 7/2010 | Hsu et al. | | 206/408 |
| 7,950,523 B2 | 5/2011 | Gelmetti | | 206/408 |
| 8,207,475 B2 | 6/2012 | Minato et al. | | 219/137.31 |
| 8,225,977 B2 | 7/2012 | Meckler | | 226/1 |
| 8,235,210 B2 | 8/2012 | De Lacerda et al. | | 206/393 |
| 9,414,759 B2 | 8/2016 | Lang | | A61B 5/04087 |
| 2001/0014706 A1 | 8/2001 | Sprenger et al. | | 523/400 |
| 2001/0020663 A1 | 9/2001 | Peterson | | 242/485.7 |
| 2002/0000391 A1 | 1/2002 | Kawasai et al. | | 206/408 |
| 2002/0003014 A1 | 1/2002 | Homma | | |
| 2002/0014477 A1 | 2/2002 | Lee et al. | | |
| 2002/0039869 A1 | 4/2002 | Achille | | 442/417 |
| 2002/0108985 A1 | 8/2002 | Garcia et al. | | 226/45 |
| 2002/0120178 A1 | 8/2002 | Tartaglia et al. | | 600/114 |
| 2003/0042162 A1 | 3/2003 | Land | | 206/408 |
| 2003/0042163 A1 | 3/2003 | Cipriant | | |
| 2003/0052030 A1 | 3/2003 | Gelmetti | | 206/397 |
| 2003/0184086 A1 | 10/2003 | Christianson | | 285/146.1 |
| 2004/0011776 A1 * | 1/2004 | Mukai | | B23K 9/1336 219/137.71 |
| 2004/0020041 A1 | 2/2004 | Ferguson, III et al. | | |
| 2004/0050441 A1 | 3/2004 | Roschi | | 138/120 |
| 2004/0133176 A1 | 7/2004 | Muthiah et al. | | 604/368 |
| 2004/0155090 A1 | 8/2004 | B-Jensen | | |
| 2004/0176557 A1 | 9/2004 | Mertens et al. | | 526/328.5 |
| 2004/0186244 A1 | 9/2004 | Hatsuda et al. | | 525/451 |
| 2004/0201117 A1 | 10/2004 | Anderson | | 264/4.3 |
| 2004/0241333 A1 | 12/2004 | Cielenski et al. | | 427/421.1 |
| 2004/0265387 A1 | 12/2004 | Hermeling et al. | | 424/486 |
| 2005/0008776 A1 | 1/2005 | Chhabra et al. | | 427/180 |
| 2005/0230372 A1 | 10/2005 | Ott | | B23K 9/1087 |
| 2005/0258290 A1 | 11/2005 | Kuper | | 242/171 |
| 2005/0261461 A1 | 11/2005 | Maeda et al. | | 528/272 |
| 2006/0016792 A1 | 1/2006 | Uecker et al. | | 219/137.71 |
| 2006/0027699 A1 | 2/2006 | Bae et al. | | |
| 2006/0070987 A1 | 4/2006 | Daniel | | 219/137.71 |
| 2006/0074154 A1 | 4/2006 | Harashina et al. | | 524/115 |
| 2006/0131293 A1 | 6/2006 | Kaufman | | 219/137.71 |
| 2006/0138116 A1 | 6/2006 | Lipnevicius | | 219/137.71 |
| 2006/0155254 A1 | 7/2006 | Sanz et al. | | 604/378 |
| 2006/0207981 A1 | 9/2006 | Diekmann | | 219/137.2 |
| 2006/0247343 A1 | 11/2006 | Kishimoto et al. | | 524/117 |
| 2006/0258824 A1 | 11/2006 | Oshima et al. | | 525/533 |
| 2006/0278747 A1 | 12/2006 | Carroscia | | |
| 2007/0056943 A1 | 3/2007 | Tenbrink | | 219/130.01 |
| 2007/0080154 A1 | 4/2007 | Ott | | B23K 9/095 |
| 2007/0151964 A1 | 7/2007 | Artelsmair et al. | | 219/137.2 |
| 2007/0158324 A1 | 7/2007 | O'Donnell | | 219/137.71 |
| 2007/0175786 A1 | 8/2007 | Nicklas | | |
| 2007/0175965 A1 | 8/2007 | Carroscia | | 228/4.5 |
| 2007/0272573 A1 | 11/2007 | Gelmetti | | |
| 2007/0284354 A1 | 12/2007 | Laymon | | 219/137.51 |
| 2008/0156925 A1 | 7/2008 | Cooper | | 242/559.3 |
| 2008/0257874 A1 * | 10/2008 | Kaufman | | B23K 9/124 219/137 R |
| 2008/0257875 A1 | 10/2008 | De Keizer | | 219/137.44 |
| 2008/0300349 A1 | 12/2008 | Fuchikami et al. | | 524/117 |
| 2008/0314876 A1 | 12/2008 | Pinsonneault et al. | | 219/74 |
| 2008/0314884 A1 | 12/2008 | Fujiwara | | B23K 9/0735 |
| 2009/0014572 A1 | 1/2009 | Weissbrod et al. | | |

(56) References Cited

U.S. PATENT DOCUMENTS

| | | | |
|---|---|---|---|
| 2009/0014579 A1 | 1/2009 | Bender et al. | |
| 2009/0200284 A1 | 8/2009 | Sanchez | 219/137.51 |
| 2010/0116803 A1 | 5/2010 | Gelmetti | 219/138 |
| 2010/0301029 A1 | 12/2010 | Meckler | B23K 9/095 |
| 2011/0042355 A1 | 2/2011 | Gelmetti | B23K 9/1333 |
| 2011/0073703 A1 | 3/2011 | Gelmetti et al. | 242/615.2 |
| 2011/0094911 A1 | 4/2011 | Gelmetti | 206/408 |
| 2011/0114523 A1 | 5/2011 | Gelmetti | 206/407 |
| 2011/0114617 A1 | 5/2011 | Gelmetti et al. | 219/137.9 |
| 2011/0132880 A1 | 6/2011 | Kossowan | 219/76.14 |
| 2012/0160819 A1 | 6/2012 | Enyedy | 219/137.71 |
| 2012/0298630 A1 | 11/2012 | Stoutamire | 219/75 |
| 2013/0112676 A1* | 5/2013 | Hutchison | B23K 9/09 |
| | | | 219/130.51 |
| 2013/0180971 A1 | 7/2013 | Peters et al. | 219/137.7 |
| 2013/0193124 A1 | 8/2013 | Peters | 219/121.63 |
| 2013/0193259 A1 | 8/2013 | Weissbrod et al. | 242/566 |
| 2013/0200055 A1 | 8/2013 | Enyedy | 219/130.21 |
| 2014/0076872 A1 | 3/2014 | Ott | 219/132 |

FOREIGN PATENT DOCUMENTS

| | | | |
|---|---|---|---|
| CN | 202240091 | 5/2012 | |
| DE | 1011840 B | 7/1957 | B21C 47/04 |
| DE | 1082215 | 11/1957 | B21C 47/10 |
| DE | 1 154 624 | 9/1963 | C08G 59/40 |
| DE | 2122958 | 11/1972 | B21C 47/14 |
| DE | 2 148 348 | 4/1973 | D01F 7/04 |
| DE | 2202177 | 7/1973 | B65H 54/80 |
| DE | 2525938 | 12/1976 | B23K 9/18 |
| DE | 26 46 218 | 4/1977 | C07F 9/32 |
| DE | 28 16 100 | 10/1978 | C08G 63/68 |
| DE | 36 09 839 | 9/1987 | F16L 57/00 |
| DE | 19909214 | 3/1999 | C08J 9/20 |
| DE | 199 10 128 | 1/2001 | A61B 1/008 |
| DE | 19958697 | 6/2001 | B01J 20/00 |
| DE | 100 06 592 | 8/2001 | C08G 59/18 |
| DE | 10202839 | 8/2003 | B01J 13/00 |
| DE | 103 60 466 | 7/2005 | B23K 9/133 |
| DE | 102007015946 | 10/2008 | B23K 9/133 |
| DE | 202011104120 | 1/2012 | B23K 9/133 |
| EA | 0584056 | 2/1994 | B65D 85/04 |
| EA | 0665 166 | 1/1995 | B65D 5/44 |
| EA | 2 286 950 | 2/2011 | B23K 9/133 |
| EP | 0017445 | 10/1980 | B65H 59/10 |
| EP | 0408259 | 4/1992 | |
| EP | 0519424 A1 | 12/1992 | B23K 9/1333 |
| EP | 0686439 A1 | 12/1995 | B21C 47/14 |
| EP | 0806429 | 11/1997 | C07F 9/655 |
| EP | 1057751 A1 | 12/2000 | |
| EP | 1 070 754 | 1/2001 | C09K 21/10 |
| EP | 1 275 595 | 1/2003 | B65D 85/04 |
| EP | 1 295 813 | 6/2003 | B65D 85/04 |
| EP | 1357059 | 10/2003 | B65D 85/04 |
| EP | 1 471 024 | 10/2004 | B65H 49/08 |
| EP | 1 698 421 | 6/2006 | B23K 9/133 |
| EP | 1 974 846 | 10/2008 | B23K 9/133 |
| EP | 2 256 064 | 1/2010 | B65H 49/08 |
| EP | 2 354 039 | 1/2010 | B65D 85/04 |
| EP | 2 168 706 | 3/2010 | B23K 9/133 |
| EP | 2695696 | 2/2014 | B23K 9/12 |
| EP | 2949416 | 12/2015 | |
| FR | 1215111 | 4/1960 | B21C 47/10 |
| FR | 2055181 | 5/1971 | B23K 35/02 |
| FR | 2 267 255 | 4/1974 | |
| FR | 2595674 | 3/1988 | B21C 47/14 |
| FR | 2 888 825 | 1/2007 | B65H 57/14 |
| GB | 880502 | 10/1961 | B21C 47/14 |
| GB | 1168928 | 10/1969 | D07B 7/10 |
| GB | 1229913 | 4/1971 | B21C 47/14 |
| GB | 1 575 157 | 9/1980 | C09K 21/12 |
| GB | 2059462 | 4/1981 | A23G 3/02 |
| GB | 2 264 482 | 9/1993 | |
| GB | 2 332 451 | 6/1999 | B65H 57/18 |
| JP | 49-13065 | 2/1974 | |
| JP | 54-035842 | 3/1979 | B65D 1/28 |
| JP | 54-043856 | 4/1979 | B21C 47/08 |
| JP | 55-054295 | 4/1980 | B23K 35/02 |
| JP | S55112176 | 8/1980 | B23K 9/12 |
| JP | 55-156694 | 12/1980 | B23K 35/368 |
| JP | 56-023376 | 3/1981 | B23K 9/00 |
| JP | 57-102471 | 6/1982 | B65H 54/82 |
| JP | 58-035068 | 3/1983 | B23K 9/12 |
| JP | 58-70384 | 5/1983 | B65D 85/04 |
| JP | 59-197386 | 11/1984 | B23K 11/30 |
| JP | 59-229287 | 12/1984 | B23K 9/12 |
| JP | 59-232669 | 12/1984 | B23K 9/12 |
| JP | 60-021181 | 2/1985 | B23K 9/12 |
| JP | 60-032281 | 2/1985 | C04B 41/82 |
| JP | 60-082275 | 5/1985 | B23K 9/12 |
| JP | 60-082276 | 5/1985 | B23K 9/12 |
| JP | 60-184422 | 9/1985 | B21C 47/26 |
| JP | 60-223664 | 11/1985 | B23K 9/12 |
| JP | 61-162541 A | 7/1986 | C08K 5/49 |
| JP | 61-293674 | 12/1986 | B23K 9/12 |
| JP | 62-009774 | 1/1987 | B23K 9/12 |
| JP | 62-111872 | 5/1987 | B65H 49/08 |
| JP | 62-287055 | 12/1987 | C22F 1/10 |
| JP | 63-147781 | 6/1988 | B65H 59/06 |
| JP | 1-65265 | 4/1989 | C23C 14/56 |
| JP | 1-240222 | 9/1989 | |
| JP | 3-264169 | 11/1991 | B23K 9/133 |
| JP | 03264169 A | 11/1991 | B23K 9/133 |
| JP | 4-112169 | 4/1992 | B23K 9/12 |
| JP | 04-133973 | 5/1992 | B65H 59/06 |
| JP | 04-274875 | 9/1992 | B21C 47/04 |
| JP | H05104248 | 4/1993 | B23K 9/10 |
| JP | 5-178538 | 7/1993 | B65H 59/06 |
| JP | 7-247058 | 9/1995 | B21C 47/24 |
| JP | 8-40642 | 2/1996 | B21C 47/28 |
| JP | 08-150492 | 6/1996 | B23K 35/02 |
| JP | 08-267274 | 10/1996 | B23K 35/30 |
| JP | 2000-202630 | 7/2000 | B23K 9/133 |
| JP | 2000-225468 | 8/2000 | B23K 9/12 |
| JP | 2000-263239 | 9/2000 | B23K 11/00 |
| JP | 2001-26375 | 1/2001 | B65H 75/16 |
| JP | 2001-150187 | 6/2001 | B21D 3/06 |
| JP | 2001-323268 A | 11/2001 | C07F 9/6574 |
| JP | 2004-025242 | 1/2004 | B23K 35/20 |
| JP | 2004-025243 | 1/2004 | B23K 9/12 |
| JP | 2005-169499 | 6/2005 | B23K 9/133 |
| JP | 2007-927 | 1/2007 | B23K 9/133 |
| JP | 2007-29971 | 2/2007 | B23K 9/133 |
| KR | 2002-0077857 | 10/2002 | B65D 85/04 |
| RU | 793678 | 1/1981 | B21C 47/02 |
| RU | 1412830 | 7/1988 | B21C 47/02 |
| WO | WO 81/03319 | 11/1981 | B65D 25/52 |
| WO | WO 8810230 | 12/1988 | B65H 49/08 |
| WO | WO 94-00493 | 1/1994 | A61K 39/00 |
| WO | WO 94-19258 | 9/1994 | B65D 5/10 |
| WO | WO 97/00878 | 1/1997 | C07F 9/6571 |
| WO | WO 98/52844 | 11/1998 | B65D 85/04 |
| WO | WO 00-50197 | 8/2000 | B23C 19/00 |
| WO | WO 01/27365 | 4/2001 | D01H 4/28 |
| WO | WO 02/094493 | 11/2002 | |
| WO | WO 03-106096 A1 | 12/2003 | B21C 47/20 |
| WO | WO 2005/005704 | 1/2005 | D04H 13/02 |
| WO | WO2005042201 | 5/2005 | |
| WO | WO 2005/061168 | 7/2005 | |
| WO | 2006091075 | 8/2006 | B23K 9/133 |
| WO | WO 2007/010171 | 1/2007 | B65H 57/00 |
| WO | WO 2007/112972 | 10/2007 | B23K 9/133 |
| WO | WO 2007/149689 | 12/2007 | B65H 57/18 |
| WO | WO 2009/007845 | 1/2009 | B23K 9/133 |
| WO | WO2009027784 | 3/2009 | B23K 9/133 |
| WO | WO 2009/143917 | 12/2009 | B65H 57/14 |

(56) References Cited

FOREIGN PATENT DOCUMENTS

| WO | WO 2011/147565 | 12/2011 | ............ B23K 9/133 |
|---|---|---|---|
| WO | WO 2013/092658 | 6/2013 | ............ B65H 57/18 |

OTHER PUBLICATIONS

Office Action issued in U.S. Appl. No. 14/289,090, dated Aug. 4, 2016 (10 pgs).
Office Action issued in U.S. Appl. No. 14/481,722, dated Jun. 14, 2016 (25 pgs).
European Search Report issued in application No. 16160312.1, dated Sep. 19, 2016 (7 pgs).
Office Action issued in U.S. Appl. No. 14/195,497, dated Sep. 9, 2016 (21 pgs).
Office Action issued in U.S. Appl. No. 14/481,722, dated Nov. 4, 2016 (18 pgs).
"International Plastics Flammability Handbook" Jurgen Troitzsch, $2^{nd}$ edition, 1990, pp. 33, 43-49 and 59.
Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Office Action issued for 09777298.2, dated Aug. 31, 2012 (4 pgs).
European Search Report, dated Mar. 2, 2011 (7 pgs).
European Search Report, dated Sep. 17, 2008.
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 6, 2010 (5 pgs).
International Preliminary Report, PCT/IPEA/409, 7 pages.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Korean Official Action dated May 16, 2011, Appln. No. 2008-7005433, (3 pgs).
Office Action issued for related U.S. Appl. No. 12/618,250, dated Apr. 26, 2012 (11 pgs).
PCT International Search Report, dated Nov. 6, 2008.
Plaza et al., Preparation of ethylenebis(nitrilodimethylene)tetrakis( phenylphosphinic acid), Inorganic Synthesis, vol. 16, No. 199, abstract, one page.
Search Report received in Applicant's counterpart European Patent Application Serial No. 08017572.2-2302.
Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
Ullmanns Encyclopedia of Industrial Chemistry, Sulfuric Acid & Sulfur Trioxide to Tetrahydrofuran, Superabsorbents, $6^{th}$ Edition, vol. 35, pp. 73, 80, 86 and 89 (2003.
U.S. Official Action dated Feb. 13, 2012, issued in U.S. Appl. No. 12/917,320 (14 pgs).
U.S. Official Action dated Dec. 14, 2012, issued in U.S. Appl. No. 12/994,686 (17 pgs).
U.S. Official Action dated Mar. 5, 2013 issued in U.S. Appl. No. 13/382,491 (33 pgs).
Notice of Allowance dated Mar. 5, 2013 issued in U.S. Appl. No. 12/593,271 (15 pgs).
Notice of Allowance dated Mar. 18, 2013 issued in U.S. Appl. No. 12/994,686 (10 pgs).
Office Action issued in related U.S. Appl. No. 12/572,994, dated Apr. 24, 2013 (22 pgs).
Italian Search Report issued in related application No. MI20121423, dated Apr. 29, 2013 (2 pgs).
Office Action issued in related U.S. Appl. No. 13/382,491, dated Jul. 11, 2013 (15 pgs).
U.S. Office Action issued in related U.S. Appl. No. 12/572,994, dated Sep. 17, 2013 (13 pgs).
Extended European Search Report issued in related application No. 13179908.2, dated Nov. 13, 2013 (6 pgs).
Office Action issued in related U.S. Appl. No. 13/330,314, dated Feb. 28, 2014 (10 pgs).
Office Action issued in related U.S. Appl. No. 12/593,271 dated Aug. 31, 2012 (7pgs).
Office Action issued in related U.S. Appl. No. 12/572,994 dated Nov. 25, 2011 (11 pgs).
Office Action issued in related U.S. Appl. No. 12/572,994 dated Aug. 12, 2011 (13pgs).
Office Action issued in related U.S. Appl. No. 12/789,095 dated Jun. 12, 2012 (8pgs).
Notice of Allowance issued in related U.S. Appl. No. 12/917,320 dated Jun. 18, 2012 (25 pgs).
Extended European Search Report issued in application No. 15168866.0, dated Dec. 22, 2015 (6 pgs).
Office Action issued in U.S. Appl. No. 14/195,497, dated Mar. 23, 2017 (24 pgs).
Office Action issued in U.S. Appl. No. 13/912,016, dated Apr. 21, 2017 (25 pgs).
European Office Action issued in application No. 16180212.9, dated Jan. 19, 2017 (7 pgs).
Office Action issued in U.S. Appl. No. 14/481,722, dated Jan. 26, 2017 (16 pgs).
OfficeAction issued in U.S. Appl. No. 14/289,090, dated Feb. 13, 2017 (21 pgs).
Office Action issued in U.S. Appl. No. 14/195,497, dated Sep. 7, 2017 (29 pgs).
Office Action issued in U.S. Appl. No. 14/289,090, dated Sep. 18, 2017 (27 pgs).
Office Action issued in U.S. Appl. No. 14/481,722, dated Jul. 17, 2017 (23 pgs).
Office Action issued in U.S. Appl. No. 14/850,753, dated Aug. 25, 2017 (64 pgs).
Notice of Allowance issued in U.S. Appl. No. 14/850,753, dated Mar. 27, 2018 (14 pgs).
Office Action issued in U.S. Appl. No. 14/195,497, dated Feb. 23, 2018 (30 pgs).
Notice of Allowance issued in U.S. Appl. No. 14/481,722, dated May 4, 2018 (19 pgs).
Office Action issued in U.S. Appl. No. 14/289,090, dated Jul. 10, 2018 (30 pgs).
U.S. Appl. No. 10/526,539, filed Mar. 3, 2005.
U.S. Appl. No. 10/596,697, filed Jun. 21, 2006.
U.S. Appl. No. 11/466,048, filed Aug. 21, 2006.
U.S. Appl. No. 12/545,717, filed Aug. 21, 2009.
U.S. Appl. No. 12/545,720, filed Aug. 21, 2009.
U.S. Appl. No. 12/593,271, filed Sep. 25, 2009.
U.S. Appl. No. 12/572,994, filed Oct. 2, 2009.
U.S. Appl. No. 12/618,165, filed Nov. 13, 2009.
U.S. Appl. No. 12/618,250, filed Nov. 13, 2009.
U.S. Appl. No. 12/691,554, filed Jan. 21, 2010.
U.S. Appl. No. 12/789,095, filed May 27, 2010.
U.S. Appl. No. 12/994,686, filed Nov. 24, 2010.
U.S. Appl. No. 13/330,314, filed Dec. 19, 2011.
U.S. Appl. No. 13/382,491, filed Jan. 5, 2012.
U.S. Appl. No. 13/744,394, filed Jan. 17, 2013.
U.S. Appl. No. 13/912,016, filed Jun. 6, 2013.
U.S. Appl. No. 14/030,879, filed Sep. 18, 2013.
U.S. Appl. No. 14/195,497, filed Mar. 3, 2014.
U.S. Appl. No. 14/289,0120, filed May 28, 2014.

(56) References Cited

OTHER PUBLICATIONS

U.S. Appl. No. 14/481,722, filed Sep. 9, 2014.
U.S. Appl. No. 14/850,753, filed Sep. 10, 2015.
U.S. Appl. No. 13/744,394, filed Jan. 17, 2013, Gelmetti et al.
U.S. Appl. No. 13/912,016, filed Jun. 6, 2013, Gelmetti.
U.S. Appl. No. 14/195,497, filed Mar. 3, 2014, Gelmetti et al.
U.S. Appl. No. 14/289,0120, filed May 28, 2014, Gelmetti et al.
U.S. Appl. No. 14/481,722, filed Sep. 9, 2014, Gelmetti et al.
U.S. Appl. No. 14/850,753, filed Sep. 10, 2015, Gelmetti et al.
Notice of Allowance issued in U.S. Appl. No. 14/850,753, dated Jan. 19, 2018 (14 pgs).
Office Action issued in U.S. Appl. No. 14/289,090, dated Jan. 4, 2018 (18 pgs).
Office Action issued in U.S. Appl. No. 14/289,090, dated Nov. 6, 2017 (6 pgs).
Office Action issued in U.S. Appl. No. 14/481,722, dated Dec. 12, 2017 (16 pgs).
U.S. Appl. No. 14/289,090, filed May 24, 2014, Gelmetti et al.
Office Action issued in U.S. Appl. No. 14/289,090, dated Dec. 17, 2018 (11 pgs).

* cited by examiner

| COLD DRIVE (no voltage) SYSTEM SETTINGS | | |
|---|---|---|
| MAXIMUM BOOST: | 75 | [TORQUE %] |
| STAND-BY BOOST: | 25 | [TORQUE %] |
| RUN THRESHOLD: | 05 | [RPM] |
| STOP THRESHOLD: | 02 | [RPM] |
| STOP DELAY: | 04 | [SEC] |

CLEAR

CONFIRM AND EXIT SETUP

Fig. 5

WIRE FEED SYSTEM AND METHOD OF CONTROLLING FEED OF WELDING WIRE

FIELD OF THE INVENTION

The invention relates to a wire feeding system, in particular for feeding cold welding wire or metal spray wire or any other wire in applications where there is no presence of current (voltage) or any other type of signal running on the wire itself during use.

Further, the present invention relates to a method of controlling feed of welding wire.

BACKGROUND

Wire feeding systems are commonly used for feeding welding wires from a supply source, for example a container in which a significant amount (up to several hundred kilograms) of welding wire is being stored, to a point called welding arc where the welding wire is being deposited through a welding torch, with the purpose of joining metal parts. Since the welding torch is usually connected to a welding robot and continuously moving, the welding wire has to be fed through a wire guiding liner conduit from the container to the welding torch. The passing of the welding wire through the inevitable bends and curvatures on the wire guiding liner conduit necessarily creates a certain amount of friction and drag. More curves along the wire guiding liner conduit can worsen the problem to the point that it becomes very difficult for the wire feeding system to function properly and to guarantee the necessary smooth feeding.

In conventional welding applications, a single feeding device pulls the wire from the container and feeds it to the welding torch and it is placed between the wire storage or source (the container) and the welding torch (the consumer). In some other welding applications the feeding device itself contains the wire source in the form of a small spool and feeds the wire to the welding torch.

In robotic and automated applications, which are designed to maximize the productivity, the trend goes towards using large bulk packs containing from few hundred kilograms to more than one ton of welding wire. These bulk containers have to be positioned in a safe area at a significant distance from the device feeding the welding wire to the welding torch and preferably on the floor in a location that can be easily accessed by a forklift. In order to comply with increasingly stricter safety regulations and standards, it is strongly advisable to refrain from placing containers with welding wire high on top of traveling robots, where the maneuver of replacing a used pack with a new one can represent a serious hazard for the robot operators and weight tolerances would only permit the use of containers carrying a limited quantity of welding wire. Placing the packs at the floor undoubtedly offers the significant advantages of making it possible to use heavier containers with more product, for a maximized downtime saving, and of working in a safer environment but it can result in the welding wire having to be pulled over significant distances by the front feeder device from bulk containers towards the welding torch.

Transporting and feeding welding wire over long distances, preferably through guiding liner conduits placed for convenience inside the cable drag chains is not an easy task and often the main pulling wire feeder close to the welding torch is not capable of reliably advancing the welding wire. To assist the front pulling feeder, systems are known which use the combined action of a so-called master feeder (the wire feeding device close to the welding torch) and a so-called slave wire feeder (a second wire feeder installed remotely from the welding torch, close to the wire supply bulk container). Both wire feeders are controlled by a common unit or are controlled by using the same data source. E.g. both wire feeders are equipped inside with the software and hardware necessary to synchronize their movements so that the welding wire is being fed to the welding torch by the combined pulling effect of the master feeder and the pushing assistance of the rear slave feeder. This interaction between the two units is possible because both are normally supplied by the same manufacturer and communicate using the same protocols but this represents, for the market, a limitation of competitiveness and an increase of costs for the end users. For example, the control data which are used to control the front pulling feeder are also sent to the slave wire feeder so that both feeders are synchronized by using the same data source.

In the attempt to reduce the dependence from the master and slave feeder manufacturers, less advanced systems are known which employ a so-called feed assisting booster that operates independently from the main wire feeder close to the welding torch. The assisting booster is not coupled with the front pulling feeder or the torch, i.e. signals for controlling the front pulling feeder or the torch are not used for controlling the rear feed assisting booster, which instead detects when the wire feeder is pulling welding wire, and then automatically engages through a mechanically controlled clutch or a similar mechanical device. However, the action of the wire feeder close to the welding torch assisted by the independent feeding booster is not as reliable and efficient as the combined synchronized cooperation of master and slave feeding systems. This is due to the fact that the booster feeder always reacts with a certain delay, which increases proportionally with the length of the wire guide liner conduit. When the wire feeder close to the welding torch starts its wire feeding action, a few seconds pass before the feed assisting rear booster recognizes that feeding is required. This is due to the inherent flexibility of the wire guiding system that allows feeding of some centimeters of welding wire into the wire guiding liner conduit (or pulling it from the wire guiding liner conduit) at one end without a consequent immediate movement of the wire at the other end. This effect is known as backlash. The same effect noticeable at a start of the feeding action can be noticed at a stop of the feeding action. The wire feeder close to the welding torch will stop without the booster feeder noticing this immediately. The backlash results in the welding wire not being advanced at the welding torch with the speed and promptness actually requested. In other words, a wire pushing booster, not synchronized and not directly interacting with the wire pulling master feeder, does not promptly and accurately react to the starts and stops commands and the wire feed speed imposed by the master feeder itself and this makes the whole welding process extremely unreliable. A delayed feeding assistance by the booster at the feeding start can cause welding torch contact tip burn-backs and a delayed feeding interruption by the booster can cause the booster rolls to scratch and deform the wire surface.

Since the existing prior art independent wire feed assisting rear boosters are not directly activated by the front feeder and the rear booster pushing action is activated normally by a built-in magnetic clutch or an equivalent mechanical device which detects that wire is eventually being pulled by the front main feeder, they are often suffering from excess over heating because the rear booster feeder motor is always in torque, also after the welding action is interrupted and the wire is not being pulled by the front wire feeder; this can contribute to considerably reduce the rear booster feeder motor lifespan and can cause a fire hazard and a consequent safety issue in the welding robot cell area.

A reliable way to remotely start or stop the rear booster, and still function independently from the main pulling feeder, is represented by the prior art embodiment of a welding wire feeding system having a wire movement sensing device formed as a self-contained stand-alone unit and adapted for being mounted onto a wire guide, and an assisting feeding device for assisting the feeding welding wire depending from signals received from the wire movement sensing device. This technology is based on the idea of actively controlling a feed assisting device, which acts in a manner similar to the known slave booster feeders, by employing the wire movement-sensing device close to the "main" master feeder that is usually the wire feeder close to the welding torch. The wire movement-sensing device is represented by a small unit, which is physically independent from the master feeder and can be mounted at a suitable location along the path of the wire, preferably close to the master feeder. This solution, however, has its drawbacks because in order to make the stand-alone front motion detecting device communicate with the rear feed assist booster, it is still necessary to connect the two units through a hampering cable and this can represent an extra cost and complicate the setup inside the robot cell. Prior art inventions also suggest a simpler way for the two units to interact through a wireless communication, but this solution is not applicable in those manufacturing facilities where Bluetooth communications can interfere with other equipment. In most automotive plants, for example, wireless communications are often banned.

In one further prior art system, a wire feeding system allows a reliable control of the rear booster and the smooth feeding of a welding wire over long distances without involving a complicated or expensive system and without any need of synchronization between the master wire feeder and the assisting booster feeder. This system uses the welding wire electrode itself as the mean through which digital data and signals, like the voltage, between the front feeder connection and the back wire booster are transmitted. This permits to eliminate the use of hampering cables and to save the cost of the motion detecting device, regardless of the distance between the front pulling feeder and the back booster and the length or the path of the wire guiding liner conduit. With this particular system, the slave feeder, or booster, detects and instantly reacts to the presence of voltage passing through the welding wire as soon as the welding power source or welding machine, supplies tension and the welding arc is struck at the welding torch tip. This detection of this signal is immediate and allows to promptly start or stop the booster motor torque in connection with the actual welding action, thus preventing unnecessary and dangerous overheating of the rear booster unit, improving the accuracy of the wire boost and increasing the booster motor lifespan, with an efficiency comparable to the conventional synchronization between feeder and booster. In the GMAW (gas metal arc) and other welding processes, as soon as welding voltage and current is supplied by the welding machine and the welding arc is struck, a tension varying from 5 to 100 Volts, travels through the welding wire electrode. Consequently, the main wire feeder simultaneously starts pulling and feeding wire from the bulk container into the welding torch, since the two actions are interconnected. This prior art system detects and exploits the presence or absence of tension signal on the welding wire, which is the equivalent of the start or stop of the main feeder, and simultaneously translates it, through the booster components and software, into a command to start or stop of the rear booster motor torque. Since the rear booster and the front main feeder are not connected and the two speeds are not synchronized, the booster software can perform a variety of additional functions like, for example, controlling the motor torque and pushing a bit more than the front feeder in order to compensate the backlash by filling with welding wire all the free space at the liner conduit curvatures, or it can stop the motor torque partially or completely after a few seconds of welding inactivity.

However some manufacturing processes and technologies like LASER welding, TIG (Tungsten Inert Gas) welding or metal spraying treatment of metal parts, do not involve any presence of current on the wire during feeding, and without voltage running on the wire during the arc, the previously described prior art invention becomes completely useless.

It is an object of the present invention to provide a wire feeding system using a stand-alone rear wire booster which can efficiently operate without any need of electronical synchronization with the front pulling wire feeder.

It is a further object of the present invention to provide a wire feeding system, which gives an immediate support to the front pulling wire feeder as soon as the front pulling wire feeder is starting to feed wire through the welding or spraying torch.

SUMMARY

The wire feeding system for feeding wire according to the present invention, in particular for transporting welding wire from a wire storage container through a front pulling wire feeder into a welding torch or a spraying torch, comprises a rear booster wire feeder and a control unit associated with the rear booster wire feeder. The rear booster wire feeder can alternatively be operated at least in two different modes:

a "pre-tension mode" in which a first feeding force is applied to the wire with the purpose of pushing it towards the point where it is consumed (the torch) and in which no external pulling force from outside the rear booster feeder is detected, and a "transport mode" in which a second feeding force is applied to the wire by the pulling front feeder with the purpose of feeding it through the welding torch with such force being higher than the first feeding force applied to the wire in the pre-tension mode.

The present invention is based on the idea of resolving the wire feeding issues caused by backlash and at the same time maintain the rear booster wire feeder in a minimum controlled pushing pre-tensed mode so that it can immediately react to the pulling force of the front feeder as soon as a transport force is exerted by the front feeder to the wire. This pre-tension mode is similar to the stand-by status which allows a computer to switch, after a controlled set delay, into a battery charge saving mode while still retaining the capability to promptly resume its full functions as soon as a simple command like a movement of the mouse or a pressed key is detected. According to the present invention, even when the front feeder is not transporting any wire and feeding it through the torch, the rear booster wire feeder continues to push the wire towards the front wire feeder in a controlled reduced manner. This force eliminates the backlash because it maintains the wire slightly pushed and readily available to be fed as soon as the front feeder resumes its pulling action. As in a computer stand-by mode, where precise software settings control the level of activity to enable a fast reactivation but minimize consumption, in the present invention the rear booster pre-tension mode can be precisely adjusted through the control software to ensure a prompt reaction to the front feeder pulling action and at the same time the fact that the first pre-tension feeding force is lower than the second transport feeding force allows to operate the electrical driving motor of the rear booster wire feeder at a reduced driving momentum and at a significantly reduced energy consumption so that there is no risk of the motor overheating even if the motor is in torque.

The pre-tension mode status can be achieved as long as no pulling force exerted from outside the rear booster wire feeder is detected within the rear booster wire feeder.

The wire booster according to the present invention can be added, retrofitted or incorporated as a stand-alone device in any welding or metal spraying existing system, without any need for synchronization with the front pulling wire feeder.

In a preferred embodiment the feeding system of the present invention can be combined with a liner conduit extending from the wire storage to a front pulling wire feeder for the purpose of transporting the wire. The liner conduit can be equipped with or defined by numerous rolls arranged beside each other and inside an outer flexible tube, with the scope of minimizing the friction of the wire inside the liner conduit.

The first feeding force is not sufficient to achieve a transport of the wire. The first feeding force can be increased or decreased through the booster control, depending on the length or the curvatures of the liner conduit: the longer the liner conduit and the more the liner conduit is curved, the higher the first feeding force will be adjusted but barely enough to neutralize the negative backlash effects and effectively pre-tension the wire although not sufficiently strong to transport the wire.

The control unit is configured to switch the rear booster wire feeder between its modes of operation.

In one embodiment, the rear booster wire feeder has two modes of operation, only.

The control unit is configured to switch the rear booster wire feeder from the transport mode back to pre-tension mode according to an adjustable predetermined delay after detecting that the front feeder no longer pulls nor transports the wire. The rear booster wire feeder is, thus, not immediately switched off after the front pulling wire feeder becomes inactive. In most automated and robotic applications the welding process can involve a sequence of multiple short intermittent welds, in which case delaying in a controlled manner the switching from transport mode to pre-tension mode, can make the rear booster feeder action more effective. In this case the wire is transported for the length of a short weld, stopped and transported again in an intermittent pattern with few seconds of pause between each weld. During the short non-welding time when the front feeder stops pulling, the rear booster motor torque continues to function in the transport mode and only after the front feeder inactivity eventually exceeds the set delay time, the control will switch the booster back to pre-tension mode. This parameter control can be particularly useful in case of a sequence made by many short welds followed by a short weld interruption: the longer the stop delay the more the reverting to a pretension-mode will be delayed, ensuring the maximum boost efficiency throughout the whole sequence of short welds. When the front feeder is not pulling, it acts as brake holding the wire but thanks to the pre-tensioned mode the rear booster feeder will not excessively push and scratch the wire surface.

The control unit may have data input options allowing a user to set or adjust the time period for switching the booster from transport mode to pre-tension mode, after no more wire transporting force is detected from outside the rear booster wire feeder. Thus, the system according to the invention is easily adaptable by the user to any type of weld sequence.

The control unit can fully control the first feeding (pre-tension mode) force and/or the second feeding (transport mode) force.

The control unit monitors at least one of:

a wire movement threshold for determining wire movement within the rear booster wire feeder effected from outside from the rear booster wire feeder (i.e. by the front pulling wire feeder), and a wire movement stop threshold for determining end of wire movement within the rear booster wire feeder effected from outside from the rear booster wire feeder.

The control unit may have data input options allowing the user to set or adjust at least one of the first feeding (pre-tension mode) force, the second feeding (transport mode) force, a wire movement threshold for determining wire movement effected by the front pulling wire feeder within the rear booster wire feeder, and a wire movement stop threshold for determining end of wire movement effected by the front pulling wire feeder within the rear booster wire feeder.

The controlling data could be set or amended through an integrated input device (e.g. booster touch screen) or through an externally connected keyboard or any other electronic interface like a computer or any other external device for the purpose of setting, adjusting and adapting control parameters (forces, times, thresholds etc.). The external device can be directly connected to the booster through a cable, or WLAN or wireless connection.

The first and/or the second feeding forces can be adjusted based on a percentage of the total electric motor drive torque potential, thus allowing the user to accurately control the rear booster feeding action.

The first feeding (pre-tension mode) force may range between 1% and 50%, with a more specific preferred adjustment between 25% and 35% of the maximum motor torque. The adjustment of the pre-tension mode force can also be set as a percentage of the second feeding (transport mode) force rather than the full motor torque potential.

The second feeding force may range between 50% to 100%, depending on the length and shape of the liner conduit used to transport the wire from the rear booster feeder to the front pulling feeder.

The control unit can comprise a wire movement sensing device detecting wire movement within the rear booster wire feeder. The wire movement sensing device comprises at least one wheel (which can also be the booster driving wheel) contacting the wire, and wherein at least one of the two parameters (wire movement run threshold and wire movement stop threshold) is defined by a predetermined wheel rotation speed. This wire movement sensing system allows to operate the stand-alone rear booster feeder independently from the front pulling wire feeder device.

In a preferred embodiment, the rear booster wire feeder comprises at least one wire driving wheel contacting the wire and a brushless electric motor for driving the at least one driving wheel. A brushless electric motor has the advantage of responding very rapidly to the driving commands of the control unit and to quickly and efficiently adapt itself to the requested torques settings of the two different modes of operation.

The control unit may comprise a controlling touch screen with memory or a PLC (programmable logic computer) or a HMI (human machine interface).

In all modes of operation of the rear booster wire feeder, a feeding force may be exerted onto the wire in the direction towards the point where the wire is consumed at the torch. The control unit controls and maintains at all times the motor at a set minimum torque and even when running for long periods of time at a minimum torque the motor(s) do not easily overheat. When the front pulling wire feeder starts pulling the wire, it also causes the rear booster wheel to turn because the minimum set torque on the motor aids the pulling action, even in presence of long and curved liner conduits.

As soon as the pulling action of the front pulling wire feeder causes an initial movement of the pushing wheel and the wheel reaches and exceeds a preset turning speed and rotation threshold, the feeder motor of the rear booster wire feeder activates in "transport mode" and starts pushing the wire at the preset operating (full) torque. On the contrary, when the front feeder stops pulling because it no longer needs to feed wire into the welding or metal spraying gun and it exceeds the preset stop wheel speed and movement threshold, after a controlled delay time, the (brushless) motor reverts back to the minimum preset stand-by torque, thus preventing motor and booster from overheating and from permanently damaging any electrical components of the device.

Contrarily to existing prior art systems which only allow to manually increase or decrease the wire feed speed, the present invention combines the wire pulling and wire holding actions of the front feeder on the wire, with accurate booster software settings, in order to command the change between two different sets of torque adjustments, through a dynamic interaction with the pulling or holding of the wire by the front feeder. Moreover the present invention differentiates itself from other prior art systems because the movement sensor is incorporated in the booster unit thus avoiding the use of hampring cables.

The present invention also provides a wire feeding system for feeding wire, in particular welding wire, from a wire storage to a welding or a spraying torch connected to and supplied by a front pulling wire feeder. The wire feeding system comprises a rear booster wire feeder and a control unit associated with the rear booster wire feeder. The control unit is programmed to control the rear booster wire feeder actions according to a programmed feed sequence. This wire feeding system is not required to have "pre-tension" and a "transport"-modes.

Instead, besides controlling the set pre-tension mode and transport mode forces and speeds, the control unit is programmed to control the rear boost wire feeder actions according to a programmed wire feed sequence. This predetermined feed sequence can be programmed to exactly match the weld sequence of the welding robot and the feed sequence of the front pulling wire feeder. In many welding systems optical devices first sense and simulate the weld sequence, and subsequently they perform the weld cycle exactly as memorized by the initial sensing. The data are obtained and memorized during a previous torch sensing process. These sequence data are recorded by or copied into the control unit of the rear booster wire feeder. Thus, the rear booster feeder can feed cold wire in perfect synchronization with the front feeder while still remaining an independent stand-alone unit. This technique is not limited to cold wire.

The present invention also provides a method of controlling feed of welding wire, in particular hot and cold welding wire, from a wire storage to a welding or a spraying torch connected to and supplied by a front pulling wire feeder, a wire feeding system comprising a rear booster wire feeder and a control unit associated with the rear booster wire feeder, the method comprises the following step:

a feed sequence is stored in the control unit, the feed sequence corresponding to a feed sequence of the front pulling wire feeder.

In the following, methods of providing the data to the control unit of the rear booster wire feeder are presented as examples.

1. Option with Voltage

A torch sensing program first simulates (before welding) but during the sensing voltage runs on the wire. The rear booster wire feeder and its control unit memorize this sequence because it also senses the voltage running on the wire, and an incorporated menu allows exact repetition of the sequence.

Example: the robot torch sensing procedure and the booster recording of the sequence are started simultaneously.

The robot simulates weld #1 which lasts 2 minutes during which the robot puts two minutes of voltage on the wire but without actually welding as it is a simulation process (control unit of rear booster wire feeder memorizes 2 minutes of voltage).

The robot simulates weld #2 which lasts 10 minutes during which the robot puts ten minutes of voltage on the wire but without actually welding (control unit of rear booster wire feeder memorizes 10 minutes of voltage).

The robot simulates weld #3 which lasts 5 minutes during which the robot puts five minutes of voltage on the wire but without actually welding (control unit of rear booster wire feeder memorizes 5 minutes of voltage).

After this sensing and memorizing procedure the robot starts welding the given sequence and rear booster wire feeder does the same 2. Option with Cold Wire The weld sequence is memorized by the robot and these data are inserted in the booster software in the control unit of the rear booster wire feeder which will repeat the weld sequence in perfect synchronization with welding torch, or the weld sequence data are inserted into the control unit manually.

EXAMPLE

Weld #1 lasts two minutes, weld #2 lasts ten minutes, and weld #3 lasts five minutes.

The present invention finally provides a wire feeding system for feeding wire, in particular welding wire, from a wire storage to a welding or a spraying torch connected to and supplied by a front pulling wire feeder, the wire feeding system comprising a rear booster wire feeder and a control unit associated with the rear booster wire feeder, wherein an optic sensor positioned nearby the welding or spraying torch and reacting to the light generated by the arc at the torch is provided. The optic sensor is connected to the control unit, the control unit being programmed to remotely control and activate the rear boost wire feeder upon receipt of a signal from the optic sensor.

In an additional embodiment of the present invention, the control of the rear booster can be achieved through a wireless or bluetooth connection to the optic front sensor positioned nearby the welding or spraying torch and reacting to the light generated by the arc at the torch: through the interaction of the optic sensor remotely connected to the control unit and the control unit being programmed to remotely control and activate the rear boost wire feeder upon receipt of a signal from the optic sensor, the booster can effectively function in all those applications where the wire is "cold", with no voltage nor any other signal running through the wire itself.

With all above embodiments, the control unit may be an independent, self-contained stand-alone unit, i.e. independent from a front pulling wire feeder and the front pulling feeder's control and from the welding control/processor. Contrarily to the prior art systems where the master feeder and the rear booster are directly connected and communicate via cable, or those prior art systems employing a stand-alone back feeder/booster which continuously pushes and easily overheats, or those prior art systems wherein the current running on the wire activates the rear booster, the present invention uses the combination of the controls available through the software and the flexibility of a motor of the rear booster feeder in order to achieve total independency with respect to any pulling front master feeding equipment and at the same time avoid dangerous overheating of the slave back booster.

In applications where the welding process puts voltage on the wire and the rear pushing booster is controlled by the voltage signal, and some technical issues prevent the device from working correctly mainly because of uncontrolled voltage variations, the cold wire control feeding system can conveniently become an emergency backup method of operating the rear booster without having to interrupt the production.

BRIEF DESCRIPTION OF THE DRAWINGS

In the drawings,

FIG. 5 shows a touchscreen with the menu setting of the rear booster wire feeder according to FIG. 4.

DETAILED DESCRIPTION OF THE INVENTION

Figure 1:
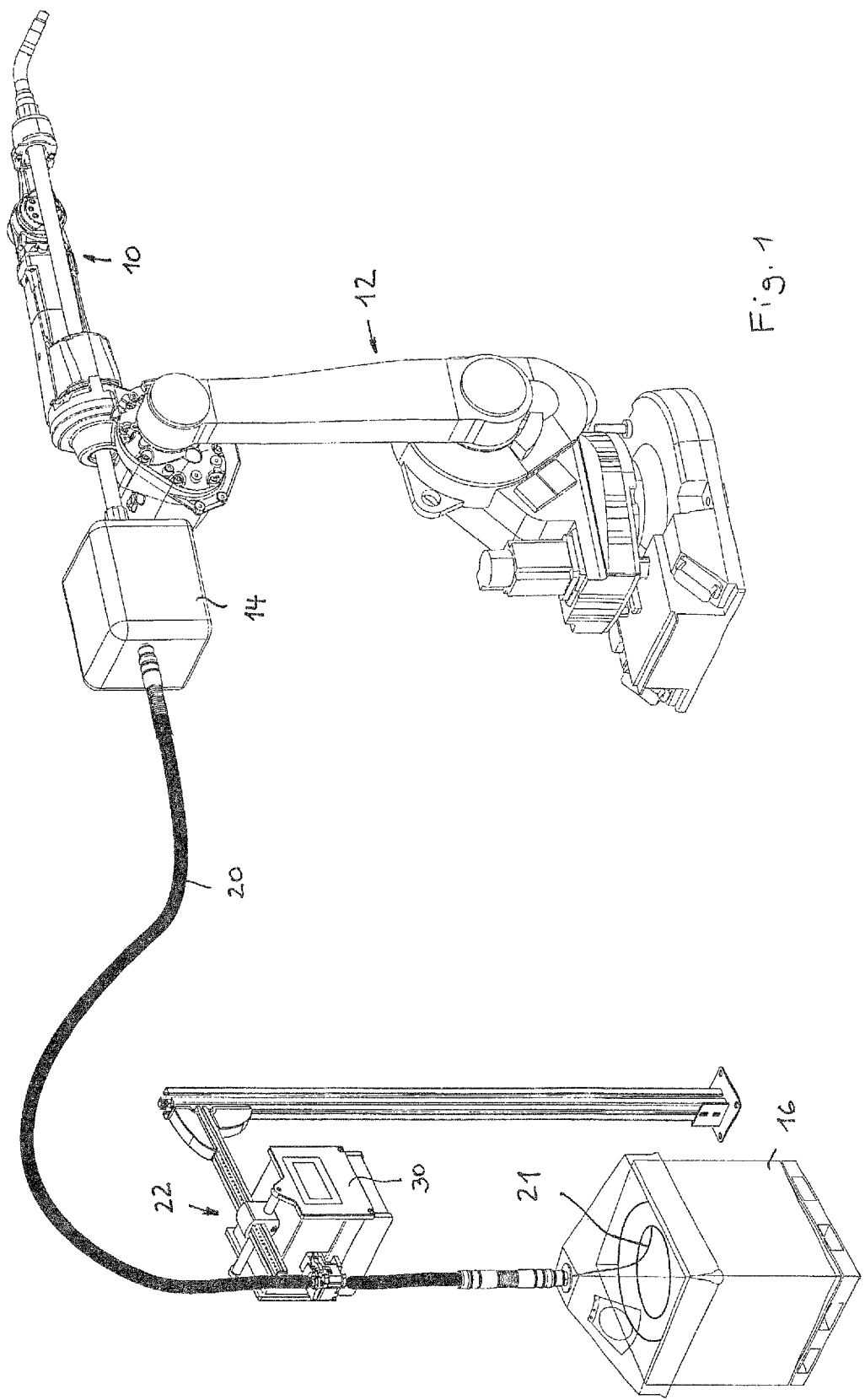
FIG. 1 schematically shows a welding system including a wire feeding system according to the invention which is acting according to the method according to the invention.
Figure 2:
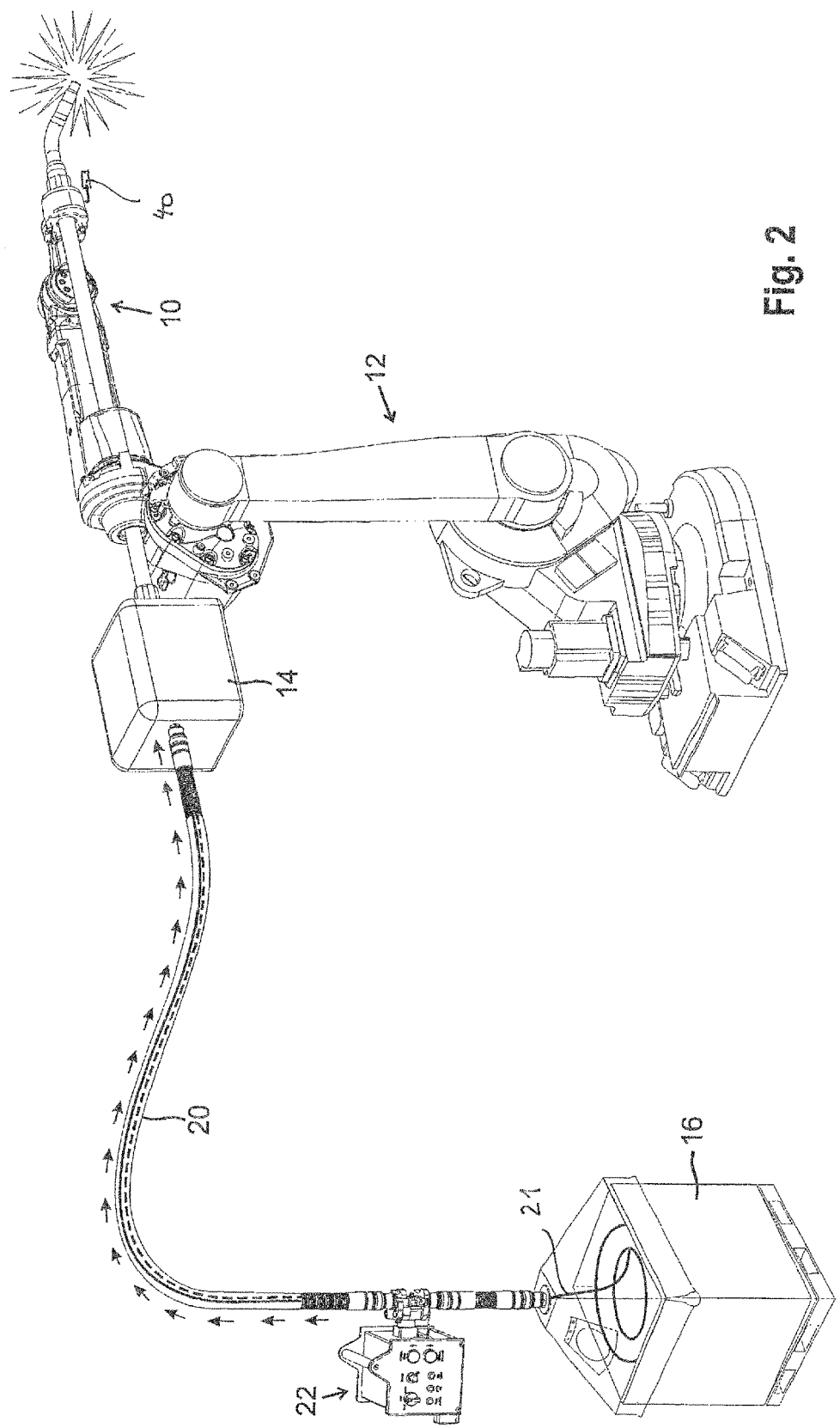
FIG. 2 shows the welding system according to FIG. 1 in the process of welding.

In FIGS. 1 and 2, a welding system is shown which comprises a welding or spraying torch 10 which is mounted on a welding robot 12, a front pulling wire feeder 14 for feeding welding wire to the torch 10, and a welding wire storage or supply 16.

In the embodiment shown, the wire supply 16 is a bulk container which can comprise a wire coil formed from several hundred kilograms of wire 21.

The wire 21 can be a cold welding wire or a metal spray wire. For both kinds of wire the term "welding wire" is used throughout this specification.

The welding wire storage or supply 16 is usually placed at significant distance from the welding torch 10 or may even stay in a separate room or outside the welding robot cell. Welding wire 18 is guided from supply 16 to front pulling wire feeder 14 by a liner conduit 20 or guide which allows to reliably guide the welding wire to front pulling wire feeder 14 (see arrows in FIG. 2).

According to one option, liner conduit 20 is formed from a plurality of interconnected bodies each of which rotatably supports a set of rollers for the purpose of reducing the friction between the welding wire and the liner conduit.

The front pulling wire feeder 14 usually comprises at least two drive wheels between which the wire 21 is pulled. One or more of the wheels is driven by an electric motor.

Due to the distance from front pulling wire feeder 14 to supply 16 an auxiliary feeder, a so-called rear booster wire feeder 22 is arranged close to supply 16. Rear booster wire feeder 22 provides a pushing effect on welding wire 21 towards front pulling wire feeder 14 and the point of wire consumption which is represented by the exit point of a torch 10.

Figure 3:
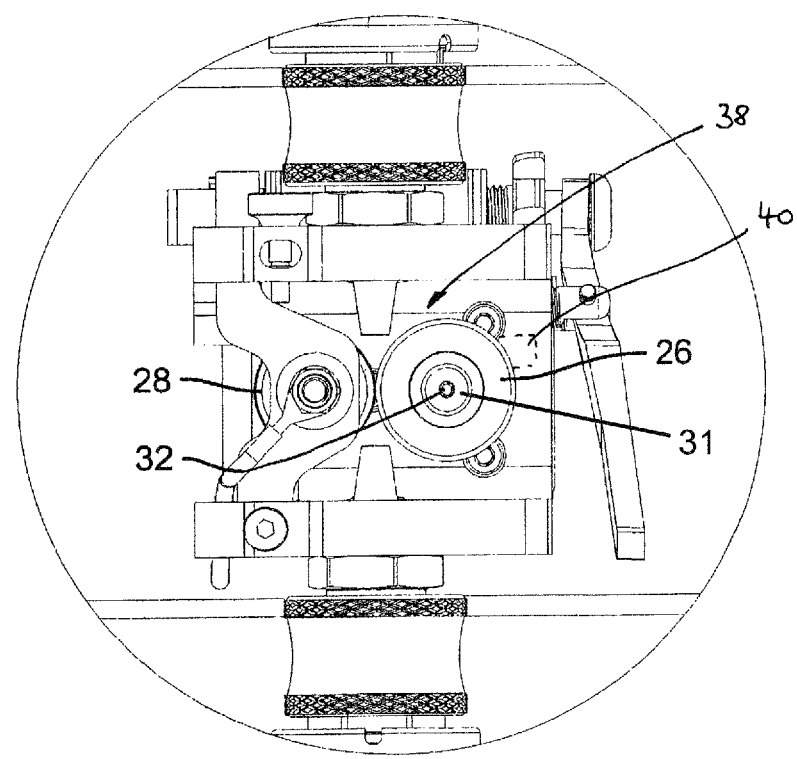
FIG. 3 shows a detail of a rear booster wire feeder of the wire feeding system according to FIGS. 1 and 2.
Figure 4:
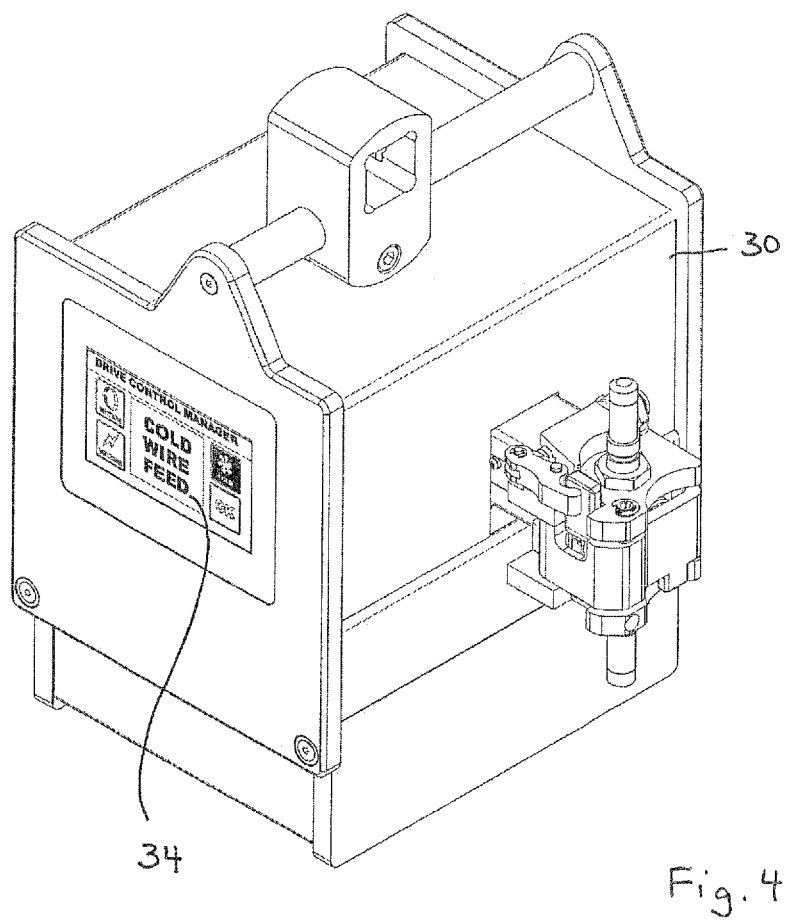
FIG. 4 shows the rear booster wire feeder of FIGS. 1 to 3.

Similar to front pulling wire feeder 14, rear booster wire feeder 22 comprises two wheels 26, 28 between which wire 21 is guided and driven. Wheel 26 is driven by an electric motor, more specifically by a brushless motor from 31 which a driving axis 32 is shown in FIG. 3.

The drive wheel 26 can be made from plastics, e.g. PEEK. Opposite antagonist wheel 28 is preferably made of steel. The antagonist wheel is normally not pushing the wire, but just keeping it pressed against the V shaped groove of the drive wheel.

Rear booster wire feeder 22 comprises a control unit 30 which is arranged within the housing of the rear booster wire feeder.

The control unit allows data input 32, through an integrated, i.e. built-in touchscreen with memory. Alternatively, control unit 30 can be connected to an external PLC device (Programmable Logic Computer) or to an HMI device (Human Machine Interface).

Control unit 30 is programmed to directly or remotely control the rear booster wire feeder actions. According to a first embodiment, this can be done based on a programmed feed sequence in accordance with a given welding sequence. This predetermined feed sequence is programmed to exactly match the weld sequence of the welding robot and the feed sequence of the front pulling wire feeder. An optical device first senses and simulates the weld sequence. The data obtained are memorized during a so-called torch sensing process. These sequence data are memorized and recorded by the control unit or copied into the control unit of the rear booster wire feeder so that the rear booster feeder can feed wire in perfect synchronization with the front feeder while still remaining an independent stand-alone unit. Alternatively, the data can be manually programmed into the control unit. With the method of controlling feed of welding wire, in particular hot and cold welding wire, the feed sequence is stored in the control unit, the feed sequence corresponding to a feed sequence of the front pulling wire feeder.

By summarizing, the feed sequence can be stored into the control unit e.g. by one of the following options:
  a) a torch sensing program first simulates welding,
     during simulation of the welding process voltage runs on the welding wire,
     the rear booster wire feeder's control unit senses and memorizes the voltage sequence, the voltage sequence being used as a wire feed sequence for the rear booster wire feeder,
  b) the weld sequence is memorized by the robot and the weld sequence data are inserted in the control unit of the rear booster wire feeder where the data are used as feed sequence for the rear booster wire feeder, and c) weld sequence or wire feed sequence data are inserted into the control unit manually.

Alternatively and according to a second embodiment, control unit 30 controls the wire feeding by the rear booster wire feeder 22 based on pulling forces exerted from outside the rear booster wire feeder 22, i.e. based on the pulling force exerted to the wire 21 by the front pulling wire feeder 14. This pulling force exerted by front pulling wire feeder 14 is detected within the rear booster wire feeder 22. Feeder 22 is an independent, self-contained, stand-alone unit which does not depend on any control data from the welding robot or from the front pulling wire feeder's control unit.

Control unit 30 contains a wire moving sensing device 38 which comprises one of wheels 26, 28 to which a rotation sensor 40 is coupled. Regardless whether wheels 26 or 28 are driven by brushless electric motor (symbolized by axis 32) or by wire 21 which is driven by front pulling wire feeder 14, only the movement of wire 21 is detected and monitored. However, when wire 21 is not moved or transported but maintained firmly still by the front feeder, this is also immediately detected by wire movement sensing device. The movement sensing device is always incorporated in the booster unit.

Due to movement of the robot 12 between welding sequences, a minimum wire movement can occur even if no wire is effectively transported. Thus, a certain wire movement stop threshold is to be set up in control unit 30. The wire movement stop threshold determines that there is no more wire transport force exerted from outside the rear booster wire feeder, i.e. from front pulling wire feeder 14.

Control unit 30 also monitors a wire movement run threshold for detecting a significant wire movement within the rear booster wire feeder from outside of the rear booster wire feeder 22, i.e. exerted by front pulling wire feeder 14 for the purpose of effectively transporting the wire or a slight movement of robot 12 in a non-welding state. Both the wire movement run threshold and the wire movement stop threshold can help determine a significant wire transport movement from a non-transport wire movement within the rear booster wire feeder 22. Both run and stop threshold parameters can be set and adjusted to the specific requirements by the data input via touchscreen. The control menu shown in FIG. 5, offers several setting options for adjusting the thresholds. In the example shown, the threshold limit value is expressed in RPMs (revolutions per minute) of the wheel contacting the wire, here wheel 26.

Besides enabling the user to precisely set and adjust the (run) movement or (stop) movement thresholds, the menu of the control unit and the control unit 30 also provides the capability to adjust the feeding forces exerted on the wire by rear booster wire feeder 22. The feeding force is proportional to the torque of the brushless motor exerted to wheel 26. Thus, the adjustment of the brushless motor torque effectively controls the pre-tension and transport mode functions.

Control unit 30 is responsible for controlling and adjusting the force exerted by the rear booster wire feeder 22 to wire 21.

As soon as the wire feeding system and front pulling wire feeder 14 and torch 10 are switched on, the rear booster wire feeder 22 is able to operate between the two functions modes: the pre-tension mode and the transport mode.

In both modes a feeding force is exerted by the rear booster wire feeder 22 to wire 21 in the direction towards the point of consumption, i.e. towards the torch 10 (consumer).

Thus, there is no mode nor a situation in which the rear booster wire feeder 22 does not exert any feeding force on the wire 21.

In the pre-tension mode, a first feeding force is applied to wire 21 which is directed towards the point of consumption. However, in this mode, no pulling force exerted from outside the rear booster wire, i.e. from front pulling wire feeder is detected. This is shown in the first line in FIG. 6 in a first operation mode. In this pre-tension mode, the first force exerted by rear booster wire feeder 22 is not sufficient to move the wire 21 through front pulling wire feeder 14 and out of the torch 10. However, the first feeding force is sufficient to reduce the wire backlash within the liner conduit 20. This first feeding force is also called "stand-by force" or "stand-by boost" as can be seen in FIG. 5.

The first feeding force can also be adjusted by user and set up in the control unit by using the menu shown in FIG. 5. As both the first and the second feeding forces must necessarily be adjusted depending on the length and curves of the liner conduit transporting the wire from wire container 16 up to the front pulling wire feeder 14, it is important for the user to be able to correctly set and adjust both the first (pre-tension mode) feeding force and the second (transport mode) feeding force. A good and reliable adjustment procedure, once the liner conduit has been installed on the welding robot, can be to disconnect the liner conduit from the front wire feeder and gradually increase the pre-tension motor torque settings in the control unit, until the wire can be easily pulled but it cannot be fed through with the only push or the rear booster feeder.

Rear booster wire feeder 22 can be switched to a transport mode by control unit 30 in which a second feeding force also directed towards the point where the wire is deposited at the torch and this second feeding force is significantly higher than the first feeding force exerted to wire 21.

Figure 6:
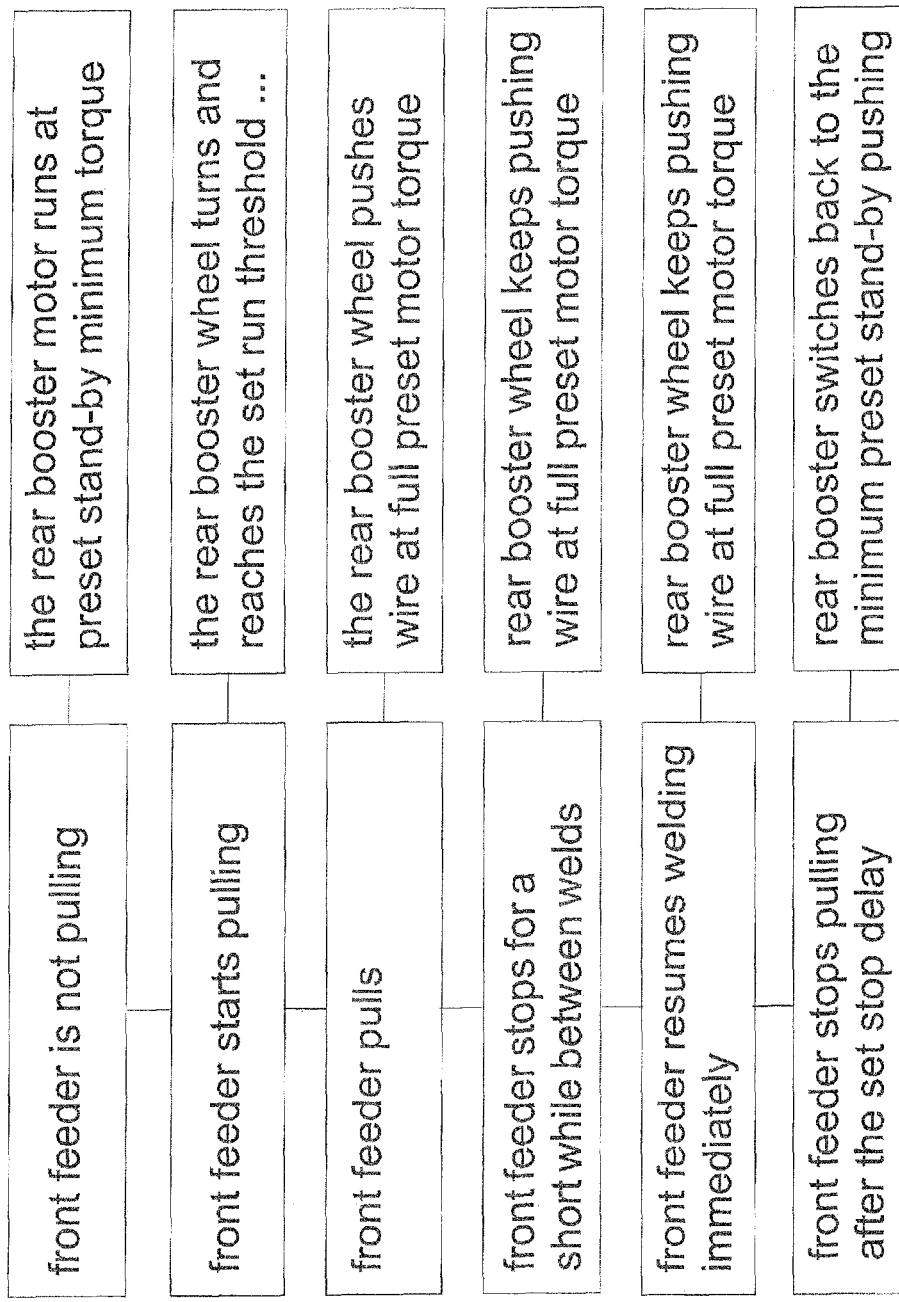
FIG. 6 shows the different modes within a wire setting.

Transport mode is inducted as soon as a pulling force exerted by front pulling wire feeder 14 is detected within rear booster wire feeder 22, after the set wire movement (run) threshold, as previously explained, is exceeded. The start of the transport mode is shown in FIG. 6 at the second and third lines. In this transport mode, the rear booster wire feeder 22 significantly supports front pulling wire feeder 14 in transporting wire 21 at the set full motor torque.

In the transport mode, a constant force and corresponding torque is exerted to wire 21 by the brushless motor.

The second feeding force (also referred to as "maximum set boost %" in FIG. 5) can be adjusted and set up by the user through the data input menu (see FIG. 5). Both, the first and the second feeding forces are indicated and set up as a percentage of the maximum brushless motor torque potential.

In the embodiment shown, the first feeding force is 25% of the total motor torque whereas the second force is 75% of the total motor torque which can be exerted by brushless motor and its axis 32.

Some welding process involve a number of short welds sequences in which front pulling wire feeder 14 intermittently only stops for a short while between welds. However, in between these intermittent short welds, the rear booster wire feeder 22, rather than switching back to the first (pre-tension mode) feeding force, continues to push the wire at the second (transport mode) feeding force. Thus, rear booster wire feeder 22 action remains highly effective and provides uninterrupted pushing so that wire 21 is immediately transported and available to the welding torch as soon as the front wire feeder resumes pulling for a new weld.

On the contrary, in those processes which involve a long pause between welds, in order to prevent unnecessarily running of the motor at full torque with a risk of device overheating and wire surface scratching, with the exclusion of those situations in which the rear booster wire feeder 22 operates according to a precise programmed feed sequence, after a preset and controlled delay the rear booster movement sensor detects that no feeding force is exerted to the wire by the front wire feeder 14, and the control unit 30 switches the rear booster wire feeder 22 back to the pre-tension mode. This set time delay, also called "stop delay" in FIG. 5, can be adjusted by the user through the setting menu of the control unit.

The previously mentioned function of the rear booster wire feeder 22 is independent from any sensor external to the rear booster wire feeder 22.

According to a third embodiment, an optic sensor 40 can be connected to control unit 30 with such optic sensor 40 positioned close enough to the torch 10 to be able to sense the light generated by the arc at torch 10. In this embodiment the rear booster wire feeder and the front sensor communicate preferably via wireless or bluetooth. Upon receiving a signal from optic sensor 40, the rear booster wire feeder 22 engages and starts pushing the wire, in support of the front pulling wire feeder. This embodiment is working independently from the previously mentioned "pre-tension" and "transport" modes.

With all embodiments, however, the control unit can be an independent, self-contained stand-alone unit.

The invention claimed is:

1. A wire feeding system for feeding welding wire from a wire storage to a welding or a spraying torch, said wire feeding system comprising:
    a front pulling wire feeder, a rear pushing booster wire feeder, and a control unit associated with the rear booster wire feeder, the rear pushing booster wire feeder having at least two different modes of operation between which it is able to be switched, the at least two different modes comprising:
    (a) a pre-tension stand-by torque mode in which a first feeding force is applied to the wire by the rear pushing booster wire feeder which is directed towards where the wire is deposited at the torch and in which no pulling force exerted from outside the rear pushing booster wire feeder is provided, and
    (b) a transport mode in which a second feeding force directed towards where the wire is deposited at the torch and being higher than the first feeding force is exerted to the wire by the rear pushing booster wire feeder,
    wherein the rear pushing booster wire feeder comprises a brushless electric motor,
    wherein the brushless electric motor is configured to run at a set minimum stand-by torque in the pre-tension mode and at an operating torque in the transport mode,
    wherein the operating torque is higher than the set minimum stand-by torque, and
    wherein the control unit is configured to control the rear pushing booster wire feeder to run at the set pre-tension minimum stand-by torque mode, and to switch between:
        the set pre-tension minimum stand-by torque mode, and
        the transport mode,
    without synchronization with switching of the front pulling wire feeder on and off.

2. The wire feeding system as in claim 1, further comprising a liner conduit extending from the wire storage to a front pulling wire feeder, the liner conduit defining a transport device for the wire.

3. The wire feeding system according to claim 2, wherein the first feeding force is adapted to a length of the welding wire from the wire storage to a consumer and to a friction of the welding wire within the liner conduit so as to move welding wire within the liner conduit and to reduce wire backlash, without moving wire out of the front pulling wire feeder.

4. The wire feeding system according to claim 1, wherein the control unit is also configured to switch the rear pushing booster wire feeder between its different modes of operation.

5. The wire feeding system according to claim 1, wherein the control unit is also configured to switch the rear pushing booster wire feeder from the transport mode in the pre-tension mode as from a predetermined time period after detecting no more wire transport generated from outside the rear pushing booster wire feeder.

6. The wire feeding system according to claim 5, wherein the control unit is also configured to control and change the force exerted by the rear pushing booster wire feeder, the control unit having a data input for a user allowing a user to change the predetermined time period after detecting no more wire transport generated from outside the rear booster wire feeder.

7. The wire feeding system according to claim 1, wherein the control unit is also configured to control and change the force exerted by the rear pushing booster wire feeder.

8. The wire feeding system according to claim 1, wherein the control unit is also configured to monitor at least one of
    a wire movement threshold for determining wire movement within the rear booster wire feeder effected from outside from the rear pushing booster wire feeder, and
    a wire movement stop threshold for determining end of wire movement within the rear booster wire feeder effected from outside from the rear pushing booster wire feeder.

9. The wire feeding system according to claim 1, wherein the control unit has a data input for a user allowing the user to amend at least one of
    the first feeding force,
    the second feeding force,
    a wire movement threshold for determining wire movement generated by the front pulling wire feeder within the rear pushing booster wire feeder, and
    a wire movement stop threshold for determining end of wire movement generated by the front pulling wire feeder within the rear pushing booster wire feeder.

10. The wire feeding system according to claim 9, wherein the control unit comprises a wire movement sensing device detecting wire movement within the rear pushing booster wire feeder, the wire movement sensing device comprises at least one wheel contacting the wire, and wherein at least one of the wire movement threshold and the wire movement stop threshold is defined by a predetermined wheel rotation speed.

11. The wire feeding system according to claim 1, wherein the rear pushing booster wire feeder comprises at least one wire driving wheel contacting the wire and a brushless electric motor for driving the at least one driving wheel.

12. The wire feeding system according to claim 1, wherein the control unit comprises a built-in touch screen device with memory.

13. The wire feeding system according to claim 1, wherein the control unit comprises a programmable logic computer or a human machine interface.

14. The wire feeding system according to claim 1, wherein all modes of operation of the rear booster wire feeder are designed so as to exert a feeding force onto the wire in the direction towards the point of consumption, i.e. the welding or spraying torch.

15. The wire feeding system according to claim 1, wherein the control unit is an independent, self-contained stand-alone unit.

16. A wire feeding system for feeding welding wire from a wire storage to a welding or a spraying torch, said wire feeding system comprising:
- a front pulling wire feeder, a rear pushing booster wire feeder, and a control unit associated with the rear pushing wire feeder, the rear pushing booster wire feeder having at least two different modes of operation between which it is able to be switched, the at least two different modes comprising:
  - (a) a pre-tension stand-by torque mode in which a first feeding force is applied to the wire by the rear pushing booster wire feeder which is directed towards where the wire is deposited at the torch and in which no pulling force exerted from outside the rear pushing booster wire feeder is provided, and
  - (b) a transport mode in which a second feeding force directed towards where the wire is deposited at the torch and being higher than the first feeding force is exerted to the wire by the rear pushing booster wire feeder,
- wherein the rear pushing booster wire feeder comprises a brushless electric motor,
- wherein the brushless electric motor is configured to run independently of the front pulling wire feeder at a stand-by torque in the pre-tension mode and at an operating torque in the transport mode,
- wherein the operating torque is higher than the set minimum stand-by torque, and
- wherein the control unit is configured to control the rear pushing booster wire feeder to switch between:
  - the set pre-tension minimum stand-by torque mode, and
  - the transport mode,
- without synchronization with switching of the front pulling wire feeder on and off, and wherein at least one of the first and the second feeding forces are adjustable based on a percentage of the total electric motor drive torque potential.

\* \* \* \* \*